US010984673B2

(12) United States Patent
Weinraub

(10) Patent No.: US 10,984,673 B2
(45) Date of Patent: Apr. 20, 2021

(54) TRAINING DEVICE FOR STRINGED INSTRUMENT PLAYER

(71) Applicant: Weinraub Enterprises Inc., Orange, CA (US)

(72) Inventor: Kara Weinraub, Orange, CA (US)

(73) Assignee: Weinraub Enterprises, Inc., Orange, CA (US)

( * ) Notice: Subject to any disclaimer, the term of this patent is extended or adjusted under 35 U.S.C. 154(b) by 0 days.

(21) Appl. No.: 16/434,555

(22) Filed: Jun. 7, 2019

(65) Prior Publication Data
US 2020/0388185 A1    Dec. 10, 2020

(51) Int. Cl.
| G09B 15/06 | (2006.01) |
| G10D 1/08 | (2006.01) |
| G10H 1/34 | (2006.01) |

(52) U.S. Cl.
CPC .............. *G09B 15/06* (2013.01); *G10D 1/08* (2013.01); *G10H 1/342* (2013.01)

(58) Field of Classification Search
CPC ........... G09B 15/06; G10D 1/08; G10H 1/342
USPC .......................................................... 84/465
See application file for complete search history.

(56) References Cited

U.S. PATENT DOCUMENTS

| 4,136,805 A | * | 1/1979 | Storms | ...................... A45F 5/00 224/219 |
| 5,657,201 A | * | 8/1997 | Kochis | ..................... G06F 1/163 361/679.41 |
| 7,304,224 B1 | * | 12/2007 | Bettis | ..................... G09B 15/06 84/293 |
| 9,280,957 B1 | * | 3/2016 | Chaves | .................. G09B 15/06 |

* cited by examiner

*Primary Examiner* — Jianchun Qin
(74) *Attorney, Agent, or Firm* — Larry K. Roberts

(57) ABSTRACT

A training device for acquiring or maintaining muscle memory and fingertip callouses of a stringed instrument player. The device includes an elongated base plate structure having a width dimension like that of a neck of a stringed instrument and a length dimension configured to accommodate a plurality of fret-like lateral spaced protrusions extending above a top surface of the base plate. First and second sets of string supports are arranged respectively at the longitudinal ends of the base plate and arranged to hold device strings in tension above the top surface. An attachment structure may be provided for attaching the device to the person of the player in a ready-to-use position. The device is configured so that the player can strum the device strings to develop or maintain muscle memory and/or fingertip callouses.

9 Claims, 5 Drawing Sheets

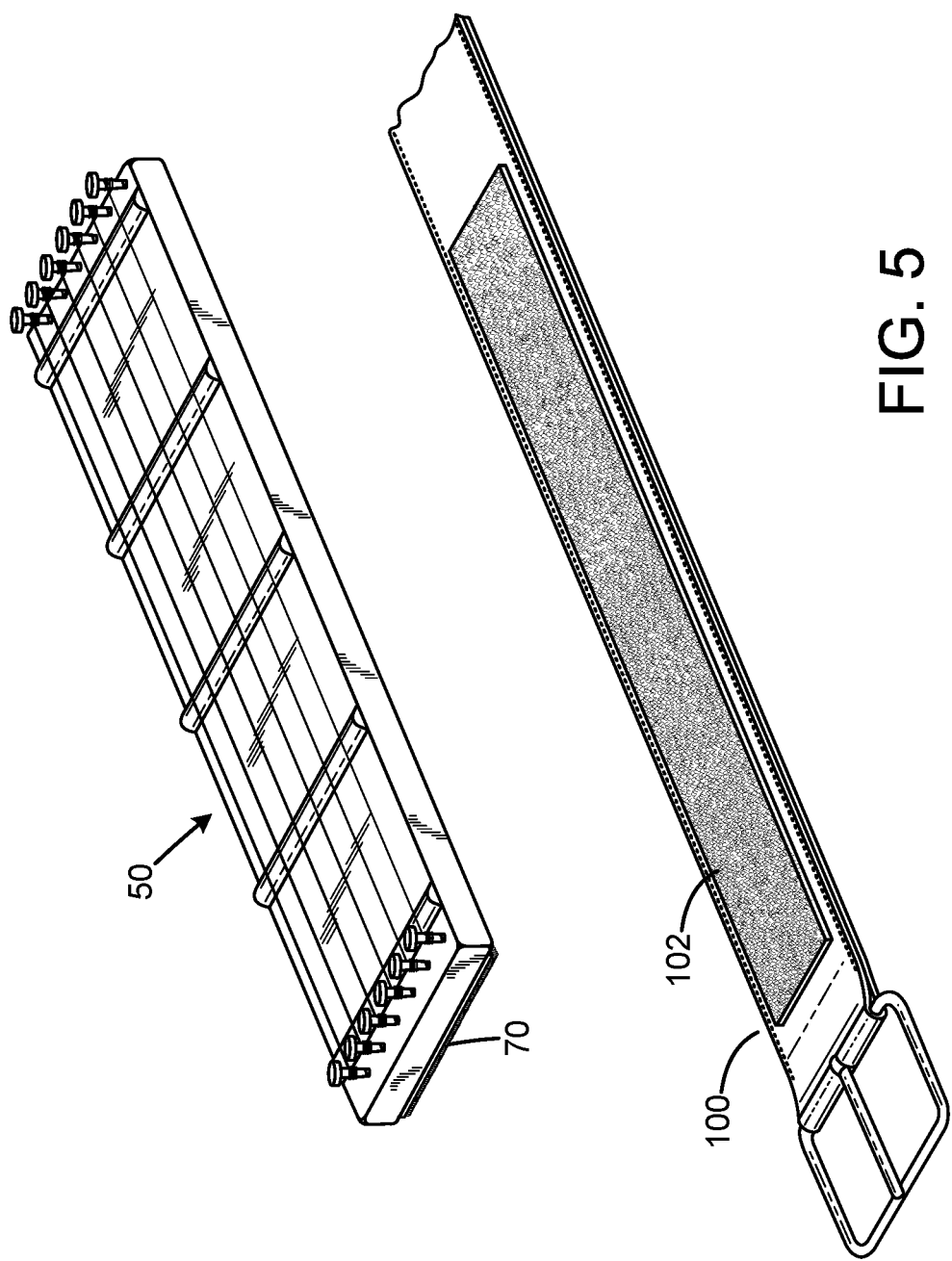

TRAINING DEVICE FOR STRINGED INSTRUMENT PLAYER

BACKGROUND

Playing stringed instruments such as guitars, mandolins, banjos and the like involves contact with the instrument strings by the player's fingers. A player needs to develop muscle memory for accurate chord transitioning, strumming, picking and plucking. Additionally, repeated play of a stringed instrument creates callouses on fingers to reduce sensitivity and pain thereby allowing a player to play longer periods of time.

It is not always reasonable or convenient to carry around a bulky instrument. Further, It can be difficult for many players to play enough to maintain muscle memory and finger callouses, Travel may be an impediment, since the instruments may be bulky and not conducive to some modes of transportation. Or the demands of a busy schedule may lead the player to reduce or stop playing for a period of time that the muscle memory and callouses dissipate.

BRIEF DESCRIPTION OF THE DRAWINGS

Features and advantages of the disclosure will readily be appreciated by persons skilled in the art from the following detailed description when read in conjunction with the drawing wherein:

FIG. 5 is an exploded isometric view of a system for attaching a device as in FIG. 1 to a waist belt to be worn by a user.

DETAILED DESCRIPTION

Figure 1:
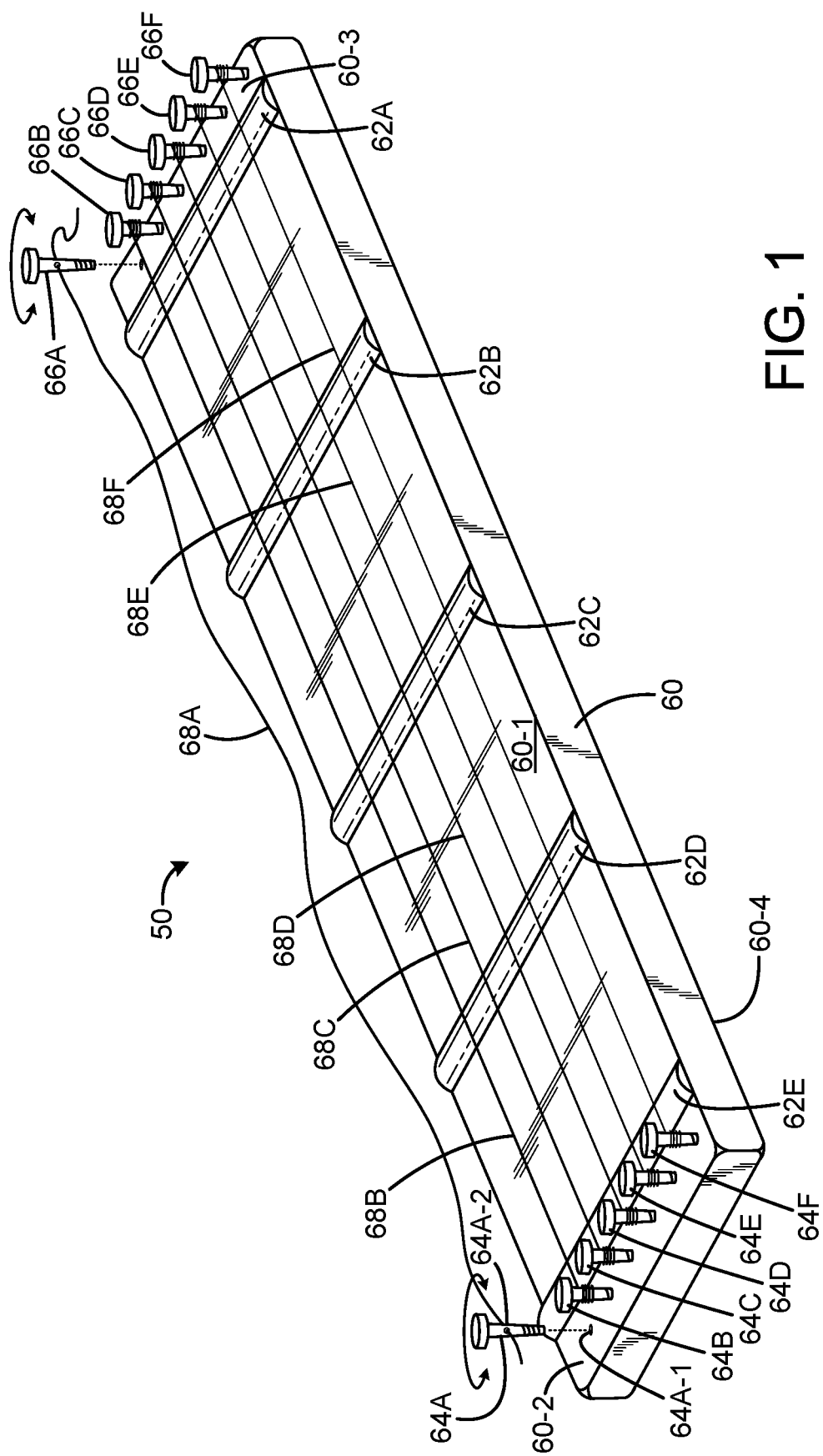
FIG. 1 is an isometric view of an exemplary embodiment of a device in accordance with the invention.

In the following detailed description and in the several figures of the drawing, like elements are identified with like reference numerals. The figures may not be to scale, and relative feature sizes may be exaggerated for illustrative purposes.

Referring now to FIG. 1, an exemplary embodiment of a training device 50 is disclosed for maintaining or building muscle memory as well as callouses on a musician's fingertips. In this exemplary embodiment, the device 50 emulates several frets on the neck of a guitar, and includes a base plate 60, typically fabricated of wood or a rigid plastic. The base plate is elongated, with a width similar to that of a guitar neck in this embodiment. Typical neck widths of a 6-string acoustic guitar, for example, measured at the nut of the guitar, are understood to be in the range of 41 to 47 mm, or about 1.62 inches to 1.85 inches. While guitar necks are tapered from the guitar body to the nut, the body plate 60 may have a constant width, as one of the features of this exemplary embodiment is that it can be used by right-handed or left-handed players. In an exemplary embodiment, the base plate 60 may have a length of approximately 6 inches, and a thickness of about ½ inch to about ¾ inch. Of course, other embodiments may employ different length, width and thickness dimensions.

The base plate 60 carries several raised rounded bars 62A, 62B, 62C, 62D and 62E protruding from the surface 60-1 of the base plate. In an exemplary embodiment, the opposed end bars may each act as a nut or bridge element (in guitar terms), and have a somewhat higher elevation or height above the surface 60-1 than the intermediate bars 62B, 62C, 62D, which may correspond to frets. The number of intermediate bars or frets in this example is three, but this may vary depending on the particular application, for example, from one to five fret-like intermediate bars or frets.

The device 50 further includes sets of pegs 64A-64F and 66A-66F on opposed respective ends 60-2, 60-3 of the base plate 60. The pegs serve to support the strings 68A-68F, six in this example, in tension over the surface 60-1 of the base plate. This exemplary embodiment emulates several frets of a six-string guitar, but the number of strings and corresponding pegs may be higher or lower, for example to emulate a stringed instrument with a different string count.

Various mechanical techniques may be used to mount the strings to the base plate. In this exemplary embodiment, the pegs are threaded into holes formed in the base plate, and each peg includes a transverse hole (64A-2 in peg 64A, for example) through which the string is passed. The string may be tied off at the peg, or have a knot formed in the string which prevents the string from pulling through the transverse hole. Each peg can be turned to tighten the string sufficiently so that the desired string tension can be obtained. The strings will be tightened and in contact with the raised bars 62A and 62E in this exemplary embodiment.

The device 50 emulates a portion of the guitar neck, and the user may exercise his/her fingers by strumming the strings, and may change finger positions along the base plate during the exercise.

Figure 2:
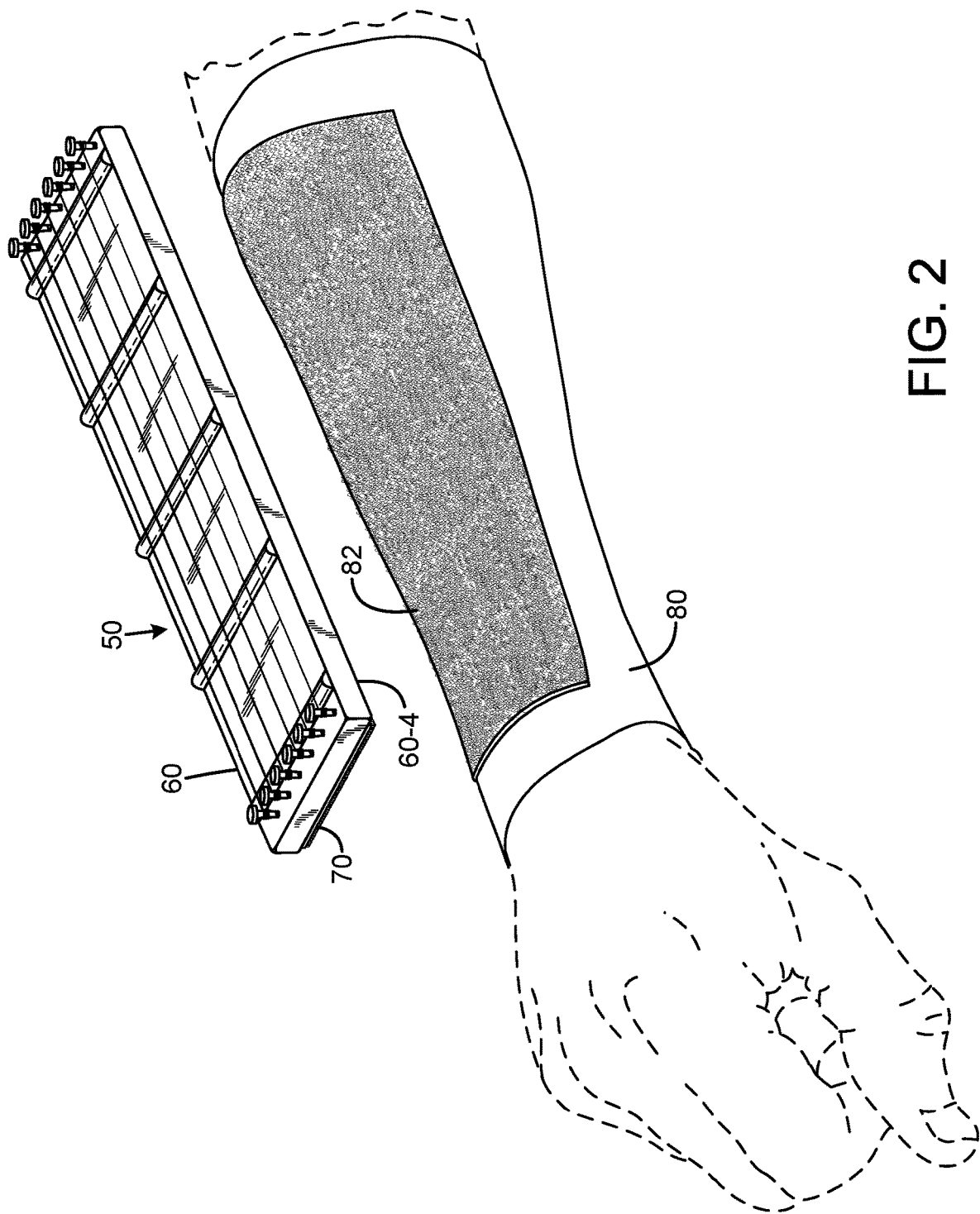
FIG. 2 is an exploded isometric view illustrating an exemplary embodiment of a system for securing the device of FIG. 1 to a user's arm.

To use the device 50, it may be used in a free-standing form. However, in accordance with a further aspect, the device 50 may be mounted or attached to the forearm of the user, so that it may be engaged by the fingers of the opposite arm of the user. FIG. 2 illustrates the device 50 configured to be secured to a sleeve structure 80. The sleeve structure 80 may be fabricated of an elastic material allowing it to be slipped over the user's hand and onto the forearm of the user in a relative tight position.

The device 50 has a layer 70 affixed to the bottom surface 60-4 of the base plate 60, and the sleeve 80 has a layer 82 formed or attached to a portion of the outer surface of the sleeve. The layers 70 and 82 in this example are complementary elements of a hook and loop fastener structure. The device 50 may be pressed against the layer 82 to engage the fastener structure. The device can be placed on either the right arm or left arm, and with the device secured on the forearm, the fingers of the opposite arm may strum the strings of the device as described above.

Figure 3:
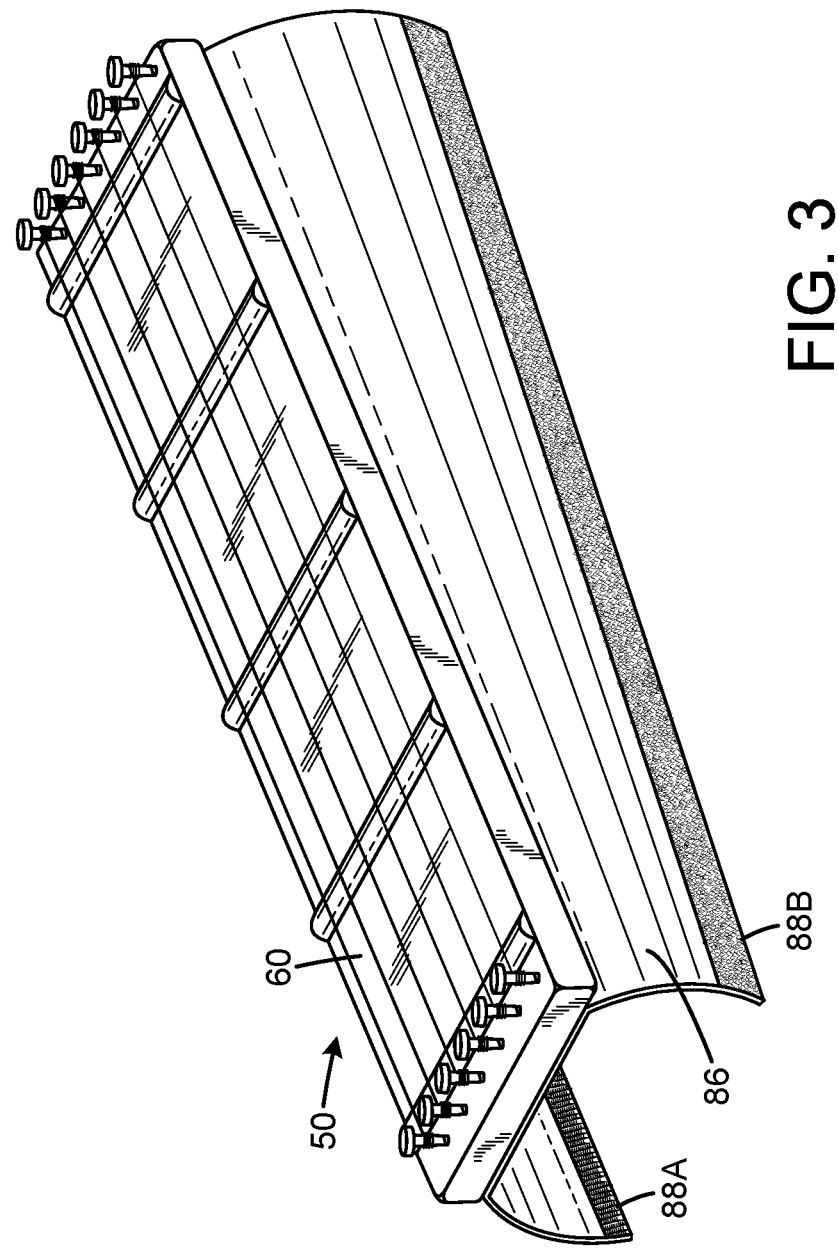
FIG. 3 is an isometric view illustrating a second exemplary embodiment of a system for securing the device of FIG. 1 to a user's arm.
Figure 4:
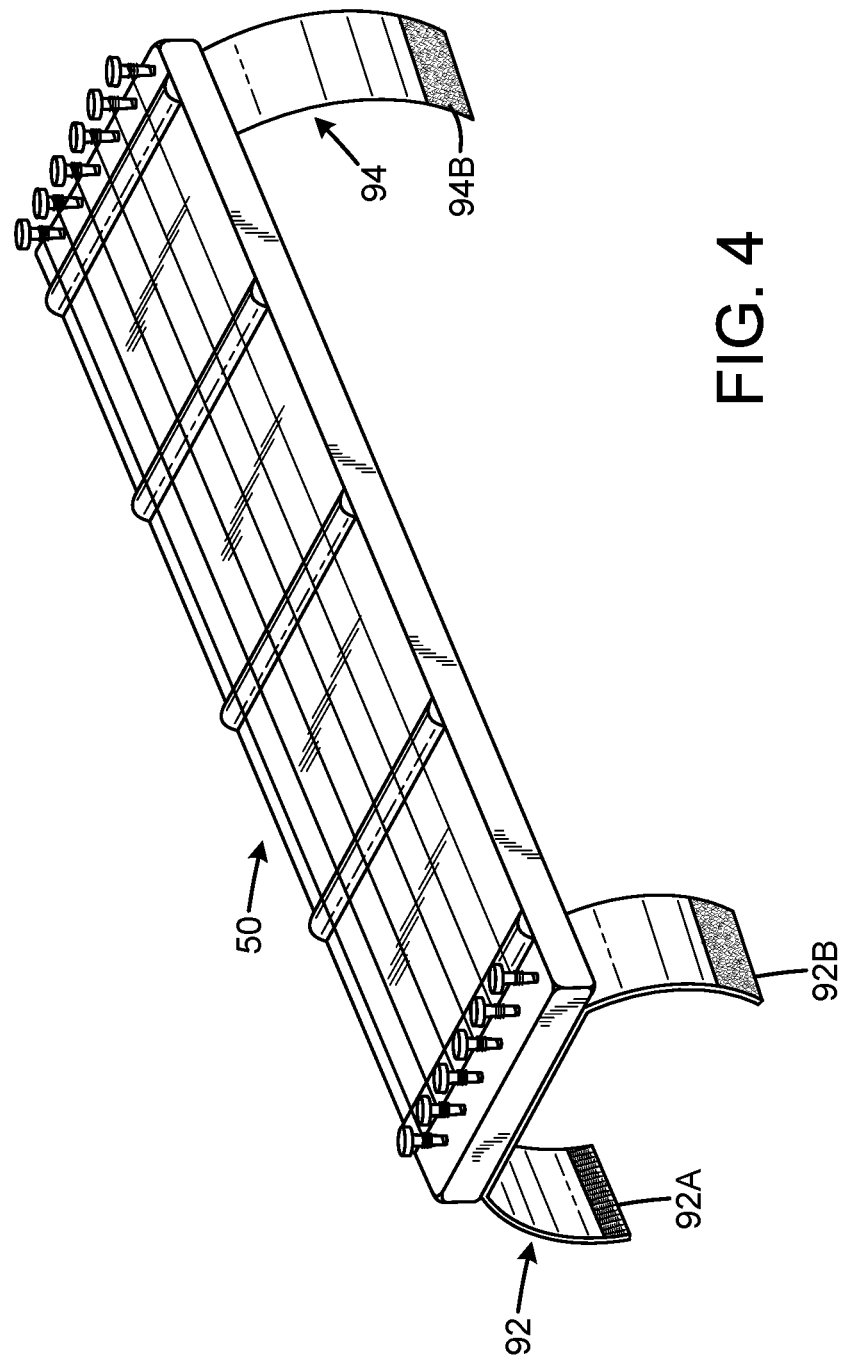
FIG. 4 is an isometric view illustrating a third exemplary embodiment of a system for securing the device of FIG. 1 to a user's arm.

In another exemplary embodiment, a sleeve structure 86 is an openable structure, as shown in FIG. 3, with complementary strips 88A, 88B formed or attached to opposed longitudinal edges of the sleeve structure 86. The strips are respective hook and loop elements which bind to each other to secure the longitudinal edges together on the user's forearm.

In a further alternate embodiment, opposite ends of the device 50 may be attached to straps 92, 94, which have hook and loop fastener strips 92A, 92B and 94A, 94B attached at the distal ends thereof. The straps may be used to affix the device 50 to a user's forearm or to another convenient attachment location allowing for ready exercising use. This location could be to the user's forearm but could also be a belt worn by the user, or even an arm rest or the like.

FIG. 5 illustrates yet another embodiment, in which the device 50 is configured for attachment to a waist belt 100 by a hook and loop structure comprising the layer 70 on the back side of the base plate 60 and a layer 102 attached to the belt 100. The device can be used to exercise the fingers of either hand when the belt is being worn.

The training device is multifunctional. When affixed to the sleeve or cuff, it allows a player to develop or maintain muscle memory, promoting accurate chord transitioning. It also develops or maintains callouses necessary for painless play, which allows the player to play the instrument longer periods of time.

When attached to the strap or belt, it allows a player to develop muscle memory promoting accurate strumming, picking and plucking, while at the same time developing callouses.

Although the foregoing has been a description and illustration of specific embodiments of the subject matter, various modifications and changes thereto can be made by persons skilled in the art without departing from the scope and spirit of the invention.

What is claimed is:

1. A training device for acquiring or maintaining muscle memory and fingertip callouses of either the right hand or the left hand of a stringed instrument player, comprising:
   an elongated base plate structure having a width dimension to emulate that of a neck of a stringed instrument and a length dimension configured to accommodate a plurality of fret-like lateral spaced protrusions extending above a top surface of the base plate, wherein the width dimension is constant along the base plate structure to accommodate use by both right- and left-handed players;
   the base plate having opposed lateral raised bars disposed at opposed first and second longitudinal ends of the base plate and extending in parallel to the spaced protrusions and having a height above the top surface which exceeds that of the plurality of the spaced protrusions;
   first and second sets of string pegs arranged respectively at the first and second longitudinal ends of the base plate and arranged to hold device strings in tension above the top surface, each string peg of said first and second sets configured to be turned to tighten a corresponding device string sufficiently to achieve a desired string tension, wherein a player may tighten string tension using string pegs of either the first set or the second set;
   a system for securing the device to the person of the player in a position suitable for use, the system comprising a sleeve configured for placement on the player's forearm;
   the device configured for attachment to the sleeve;
   wherein the device and securing system are configured for placement on either the player's right arm or left arm, so that the fingers of the player's opposite arm may strum the strings of the device to develop or maintain at least one of muscle memory and fingertip callouses and turn pegs of either the first set or the second set to adjust tension on the strings.

2. The device of claim 1, wherein the system comprises a hook and look fastener structure for mounting the device to the sleeve.

3. The device of claim 1, wherein the sleeve is an elastic sleeve structure having a closed circumferential configuration, configured to be pulled onto the player's forearm and sized such that the sleeve fits tightly on the forearm.

4. The device of claim 1, wherein the sleeve has an open configuration with opposed longitudinal edges, and an attachment structure for attaching the opposed edges together to secure the sleeve in place on the player's forearm.

5. The device of claim 1, wherein the system and device are configured for use by a player's left or right hand.

6. The device of claim 1, wherein the plurality of lateral fret-like protrusions consists of from one to five protrusions.

7. A training device for acquiring or maintaining muscle memory and fingertip callouses of either the right hand or the left hand of a stringed instrument player, comprising:
   an elongated base plate structure having a width dimension to emulate that of a neck of a stringed instrument and a length dimension configured to accommodate a plurality of fret-like lateral spaced protrusions extending above a top surface of the base plate, wherein the width dimension is constant along the base plate structure to accommodate use by both right- and left-handed players;
   the base plate having opposed lateral raised bars disposed at opposed first and second longitudinal ends of the base plate and extending in parallel to the spaced protrusions and having a height above the top surface which exceeds that of the plurality of the spaced protrusions;
   first and second sets of string pegs arranged respectively at the first and second longitudinal ends of the base plate and arranged to hold device strings in tension above the top surface, each string peg of said first and second sets configured to be turned to tighten a corresponding device string sufficiently to achieve a desired string tension, wherein a player may tighten string tension using string pegs of either the first set or the second set;
   a system for securing the device to the person of the player in a position suitable for use;
   wherein the device and system are configured for placement on either the player's right arm or left arm, so that the fingers of the player's opposite arm may strum the strings of the device and turn the string pegs of either the first set or the second set to adjust tension on the strings, the system comprising straps attached to the device and configured to encircle the player's forearm to secure the device on the forearm.

8. A training device for acquiring or maintaining muscle memory and fingertip callouses of either hand of a stringed instrument player, the training device comprising:
   an elongated base plate structure having a width dimension of that of a neck of a stringed instrument and a length dimension configured to accommodate a plurality of fret-like lateral spaced protrusions extending above a top surface of the base plate, wherein the width dimension is constant along the base plate structure to accommodate use by both right- and left-handed players;
   first and second sets of string supports arranged respectively at the first and second longitudinal ends of the base plate and arranged to hold device strings in tension above the top surface, the first and second sets comprising first and second sets of string pegs, each string peg of said first and second sets configured to be turned to tighten a corresponding device string sufficiently to achieve a desired string tension;

an attachment structure for attaching the device to the person of the player in a ready-to-use position, wherein the attachment structure is configured to attach the device to a waist belt worn by the user;

wherein the device is configured so that the player can turn pegs of either the first set or the second set to adjust tension on the strings and can strum the device strings to develop or maintain at least one of fingertip callouses and muscle memory on either the left hand or the right hand of the player.

9. The device of claim 8, wherein the plurality of lateral fret-like protrusions consists of from one to five protrusions.

\* \* \* \* \*